(12) United States Patent
Koch et al.

(10) Patent No.: US 11,210,480 B2
(45) Date of Patent: Dec. 28, 2021

(54) DYNAMIC COMPENSATION OF A PHASED ARRAY RFID READER

(71) Applicant: ZEBRA TECHNOLOGIES CORPORATION, Lincolnshire, IL (US)

(72) Inventors: Michael J Koch, Fort Salonga, NY (US); Alexander M. Jacques, Kings Park, NY (US); Camilo A. Gaitan Parra, Staten Island, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/723,972

(22) Filed: Dec. 20, 2019

(65) Prior Publication Data

US 2021/0192156 A1 Jun. 24, 2021

(51) Int. Cl.
| | | |
|---|---|---|
| G06K 7/00 | (2006.01) | |
| G06K 7/10 | (2006.01) | |
| H01Q 3/36 | (2006.01) | |
| H01Q 21/29 | (2006.01) | |

(52) U.S. Cl.
CPC ....... *G06K 7/10356* (2013.01); *G06K 7/0095* (2013.01); *G06K 7/10346* (2013.01); *H01Q 3/36* (2013.01); *H01Q 21/293* (2013.01)

(58) Field of Classification Search
None
See application file for complete search history.

(56) References Cited

U.S. PATENT DOCUMENTS

| | | | | |
|---|---|---|---|---|
| 6,184,841 B1* | 2/2001 | Shober | ............... | H01Q 1/2225 343/853 |
| 6,466,771 B2* | 10/2002 | Wood, Jr. | ............ | G06K 7/0008 455/101 |
| 7,180,402 B2* | 2/2007 | Carrender | .......... | G06K 19/0723 340/10.1 |
| 8,185,062 B2* | 5/2012 | Rofougaran | ......... | H04B 7/0837 455/80 |
| 8,233,872 B2* | 7/2012 | Nagai | ................ | G06K 19/0723 455/296 |

FOREIGN PATENT DOCUMENTS

| | | |
|---|---|---|
| WO | WO 00157546 A1 | 2/2000 |
| WO | WO 2009151778 A2 | 12/2009 |

OTHER PUBLICATIONS

Combined Search and Examination Report for Great Britain Patent Application No. GB2020075.4 dated Jul. 7, 2021.

\* cited by examiner

*Primary Examiner* — K. Wong
(74) *Attorney, Agent, or Firm* — Yuri Astvatsaturov

(57) ABSTRACT

Methods and devices for performing dynamic compensation of a phased array RFID reader are disclosed herein. An example method includes configuring an RFID reader having an antenna array to compensate for determined antenna element phase-shift errors. The method includes exciting a reference antenna element of the antenna array, emitting an emitted signal, receiving the emitted signal via a receiver antenna element of the antenna array, and generating a received signal. The method further includes determining, by a processor, a phase shift of the received signal relative to the emitted signal, and determining a phase-shift error. The method then includes configuring the RFID reader to compensate for the determined phase-shift error associated with the receiver antenna element in response to receiving an RFID tag signal.

20 Claims, 6 Drawing Sheets

DYNAMIC COMPENSATION OF A PHASED ARRAY RFID READER

BACKGROUND

Warehouses, retail spaces, hospitals, daycares, laboratories or other venues often employ Radio Frequency Identification (RFID) technology to track various objects located therein. For example, products, packages, vehicles, people, scanners, and robots may all by tagged with an RFID tag. An RFID positioning system located in the venue may then track the location of tagged objects as the objects traverse the venue. RFID sensing station are positioned throughout a venue, such as in overhead locations, on walls, or other surfaces, and operated to identify RFID tags on targets moving throughout the venue. The RFID sensing stations are connected to a network host computer or server. The specific location of any particular RFID-tagged product in the venue is typically determined by having the host computer process the payloads and capture data from a plurality of the RFID sensing stations and using triangulation/trilateration techniques.

One method of determining the location of an RFID tagged product in a venue relies on accurately determining the angle of arrival of received RFID signals in environments with a high densities RFID tags such as with people in a crowded room, clothing on shelves and racks, or medicines in cabinets in a pharmacy or hospital storage vault. The ability to estimate the angle of arrival of a received signal at an RFID reader is related to the phases of the RFID signal received at a plurality of RF antennas in an RF antenna array. Therefore, the ability to properly estimate the bearings of a received RFID signal is related to the ability to accurately control the phase shift of each of the antenna elements that comprise the antenna array. The most significant factors that limit the ability to accurately control the phase to each antenna element are the ability to match the antenna cable lengths from the transmit/receive port to the respective antenna elements, and the frequency dependent phase shifts that are inherent in the transmit, receive, and antenna element circuits.

SUMMARY

In an embodiment, the present invention is a method for configuring an RFID reader having an antenna array. The method comprises exciting, via a controller of the RFID reader, a reference antenna element of the antenna array; emitting, via the reference antenna element, an emitted signal, the emitted signal having an emitted signal amplitude, emitted signal frequency, and emitted signal phase; receiving the emitted signal via a receiver antenna element of the antenna array; generating, via the receiver antenna element, a received signal, the received signal having a received signal amplitude and a received signal phase; determining, via a processor, a phase shift of the received signal relative to the emitted signal; determining, via the processor, a phase-shift error, the phase-shift error being determined from a determined phase shift and an expected phase shift; and configuring the RFID reader to compensate for the phase-shift error associated with the receiver antenna element in response to receiving an RFID tag signal.

In a variation of the current embodiment the receiver antenna element is one of a plurality of receiver antenna elements; and the method further comprises: receiving the emitted signal at each of the plurality of receiver antenna elements; generating, via each of the plurality of receiver antenna elements, a plurality of received signals, each received signal of the plurality of received signals having a corresponding received signal amplitude and received signal phase; determining, via the processor, a plurality of phase shifts relative to the emitted signal, wherein each of the plurality of phase shifts corresponds to one of the received signals of the plurality of received signals; determining, via the processor, a plurality of phase-shift errors, each of the plurality of phase-shift errors corresponding to one of the plurality of receiver antenna elements, and each of the plurality of phase-shift errors being determined by a corresponding determined phase shift, of a plurality of determined of phase shifts, and an expected phase shift of a plurality of expected phase shifts; and configuring, in response to receiving an RFID tag signal, the RFID reader to compensate for each of the phase-shift errors of the plurality of phase-shift errors associated with each of the corresponding receiver antenna elements of the plurality of receiver antenna elements.

In a variation of the current embodiment the method further comprises: receiving, via the plurality of receiver antenna elements of the antenna array, an RFID tag signal, the RFID tag signal having a corresponding RFID tag signal amplitude, and RFID tag signal phase at each of the plurality of receiver antenna elements; compensating, via the RFID reader, the phase shift of the RFID tag signal received at each of the plurality of receiver antenna elements; analyzing, via the processor, a compensated RFID tag signal to determine a plurality of compensated RFID tag signal phases received, the plurality of compensated RFID tag signal phases corresponding to the plurality of receiver antenna elements; and determining, via the processor, an angle of arrival of the RFID tag signal from the plurality of compensated RFID tag signal phases received at the plurality of receiver antenna elements.

In another embodiment, the present invention is a system for configuring an RFID reader with an antenna array. The system comprising: a plurality of antenna elements, each of the plurality of antenna elements being part of the antenna array; a phase shifter, configured to shift the phase of an electrical signal; a non-transitory memory configured to store data and computer readable instructions; a controller communicatively coupled to the plurality of antenna elements, wherein the controller is configured to excite the antenna elements, and receive excitations from the antenna elements; and a processor configured to execute the computer readable instructions to cause the system to: excite, via the controller, a reference antenna element, the reference antenna element being one of the antenna elements of the plurality of antenna elements of the antenna array; emit, via the reference antenna element, an emitted signal, the emitted signal having an emitted signal amplitude, emitted signal frequency, and emitted signal phase; receive the emitted signal via a receiver antenna element, the receiver antenna element being one of the plurality of antenna elements of the antenna array; generate, via the receiver antenna element, a received signal, the received signal having a received signal amplitude and a received signal phase; determine, via the processor, a phase shift of the received signal relative to the emitted signal; determine, via the processor, a phase-shift error, the phase-shift error being determined from a determined phase shift and an expected phase shift; and configure, in response to receiving an RFID tag signal, the RFID reader to compensate for the phase-shift error associated with the receiver antenna element.

In a variation of the current embodiment the receiver antenna element is one of a plurality of receiver antenna elements; and the computer readable instructions further cause the system to: receive the emitted signal at each of the plurality of receiver antenna elements; generate, via each of the plurality of receiver antenna elements, a plurality of received signals, each received signal of the plurality of received signals having a corresponding received signal amplitude and received signal phase; determine, via the processor, a plurality of phase shifts relative to the emitted signal, wherein each of the plurality of phase shifts corresponds to one of the received signals of the plurality of received signals; determine, via the processor, a plurality of phase-shift errors, each of the plurality of phase-shift errors corresponding to one of the plurality of receiver antenna elements, and each of the plurality of phase-shift errors being determined by a corresponding determined phase shift, of a plurality of determined of phase shifts, and an expected phase shift of a plurality of expected phase shifts; and configure, in response to receiving an RFID tag signal, the RFID reader to compensate for each of the phase-shift errors of the plurality of phase-shift errors associated with each of the corresponding receiver antenna elements of the plurality of receiver antenna elements.

In a variation of the current embodiment the computer readable instructions further cause the system to: receive, via the plurality of receiver antenna elements of the antenna array, an RFID tag signal, the RFID tag signal having a corresponding RFID tag signal amplitude, and RFID tag signal phase at each of the plurality of receiver antenna elements; compensate, via the RFID reader, the phase shift of the RFID tag signal received at each of the plurality of receiver antenna elements; analyze, via the processor, a compensated RFID tag signal to determine a plurality of compensated RFID tag signal phases received, the plurality of compensated RFID tag signal phases corresponding to the plurality of receiver antenna elements; and determine, via the processor, an angle of arrival of the RFID tag signal from the plurality of compensated RFID tag signal phases received at the plurality of receiver antenna elements.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
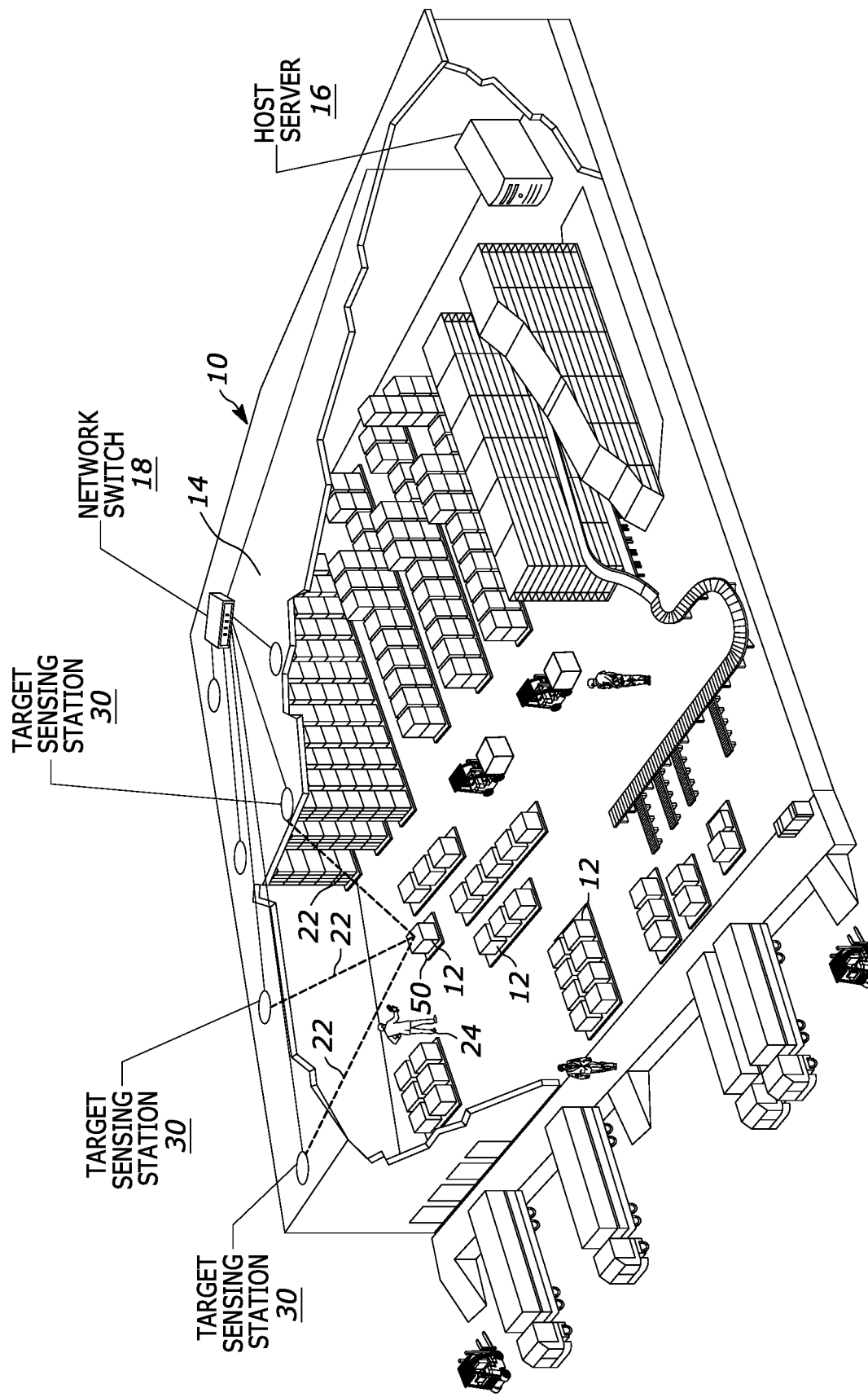
FIG. 1 illustrates an example venue in the form of a warehouse in which movable products may be located and tracked using RFID sensing stations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

RFID systems may be implemented using a plurality of overhead target sensing stations, each station having one or more transceiver-based sensing units that identify targets in the venue. For example, these sensing units may be RFID transceiver units that identify targets by identifying transmitters, such as RFID tags, associated with the targets. Therefore, it is important that each RFID transceiver unit be as accurate as possible in determining the bearings of an RFID in a venue for accurate representation of a location or movement of a desired target or object.

In various embodiments of the present disclosure, a method, and related systems and device are described for dynamic compensation of a phased array RFID reader. In various embodiments, a method includes exciting a reference antenna of the phased array RFID reader to cause the reference antenna to emit a reference signal. The method further includes receiving the reference signal at a receiver antenna of the phased array RFID reader and to generate a received signal. Both of the reference signal and received signal have signal phases, and a processor determines a phase shift between the received signal and the reference signal. A phase-shift error of the received signal is then determined and the RFID reader is configured to compensate for the phase-shift error of the received antenna. In some embodiments, the methods described herein are performed simultaneously for a plurality of antennas in a phased array RFID reader, and in embodiments, it is envisioned that the methods are performed iteratively, changing the reference antenna and receiver antennas with each iteration. The various embodiments described herein may be performed in an RFID reader and may allow for determining the bearings of an RFID signal, and therefore position of an RFID tag, with higher accuracy.

In various embodiments, RFID readers configured to perform such methods are provided as well.

In an embodiment, a real-time location system (RTLS) for passive RFID technology may be based on an angle of arrival of an RF signal at an RFID reader or multiple RFID readers. The location accuracy using the methods disclosed herein are a direct function of the ability to accurately estimate the angle of arrival, or bearing, of the RF signal from the RFID tag to the RFID reader. Improving the ability to accurately control the phase shift to each antenna element over the entire operating frequency range of the reader has a direct impact in improving the bearing estimation and RFID tag location accuracy of the system.

Referring now to the figures, FIG. 1 depicts an example venue 10 in the form of a warehouse in which movable products 12, shown in FIG. 1 as cuboid cartons for simplicity, may be located and tracked in accordance with the techniques described herein. The venue 10 may be any indoor or outdoor venue, and may have any layout or configuration. Although the example venue 10 is illustrated as a warehouse, the disclosed embodiments may be implemented at other types of venues (such as a retail store, an airport, a stadium, a performance center, a school, a hospital, etc.). Each movable product 12 is tagged with a mobile target, such as a passive or active RFID product tag. The RFID product tag may be associated with a single product representative of one warehoused item or multiple warehoused items. In some examples, the RFID product tag is associated with a pallet 50, or a container, for supporting multiple products 12.

A multitude of target sensing units or stations 30 are deployed in the venue 10. Each station 30 may be stationary and mounted at desired overhead positions, for example, on, or adjacent to, a ceiling 14. Merely by way of example, the target sensing stations 30 can be installed every twenty to eighty feet apart in a grid pattern. The number of target sensing stations 30 and the spacing of the target sensing stations 30 may depend on the size of the venue, e.g., thirty, sixty, ninety, or more stations in a venue spaced at a desired distance apart.

A network computer or host server may be a controller 16, typically locally located in a backroom at the venue 10. The controller 16 comprises one or more computers and is in wired, wireless, direct, or networked communication with each target sensing station 30, for example, through a network switch 18. The controller 16 may also be remotely hosted in a cloud server. The controller 16 may include a wireless RF transceiver that communicates with each station 30. For example, Wireless Fidelity (Wi-Fi) and Bluetooth® are open wireless standards for exchanging data between electronic devices that may be employed to allow the controller 16 to communicate with the each station 30. The server or controller 16 controls each station 30. In other examples, any of the functions of the controller 16 described herein may be implemented at any one or more of the stations 30.

The computer systems and stations described herein may be connected via a communication network, which can include local and wide-area wireless networks, wired networks, or other IEEE 802.11 or Wi-Fi™ wireless communication systems, including virtual and extended virtual networks. It is envisioned that the communication network includes a controller and various target sensing stations that provide the operations described herein. It should be recognized that the present techniques could also be applied to any suitable wireless communication system. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

FIG. 1 illustrates how knowing the accurate position of a specific movable product 12 in the venue 10 is important for any shipping or storage industries. The methods and systems described herein may allow for more accurate tracking of movable products, which decrease shipping times, decrease shipping costs, increase worker productivity, and increase product security and theft management capabilities.

Figure 2:
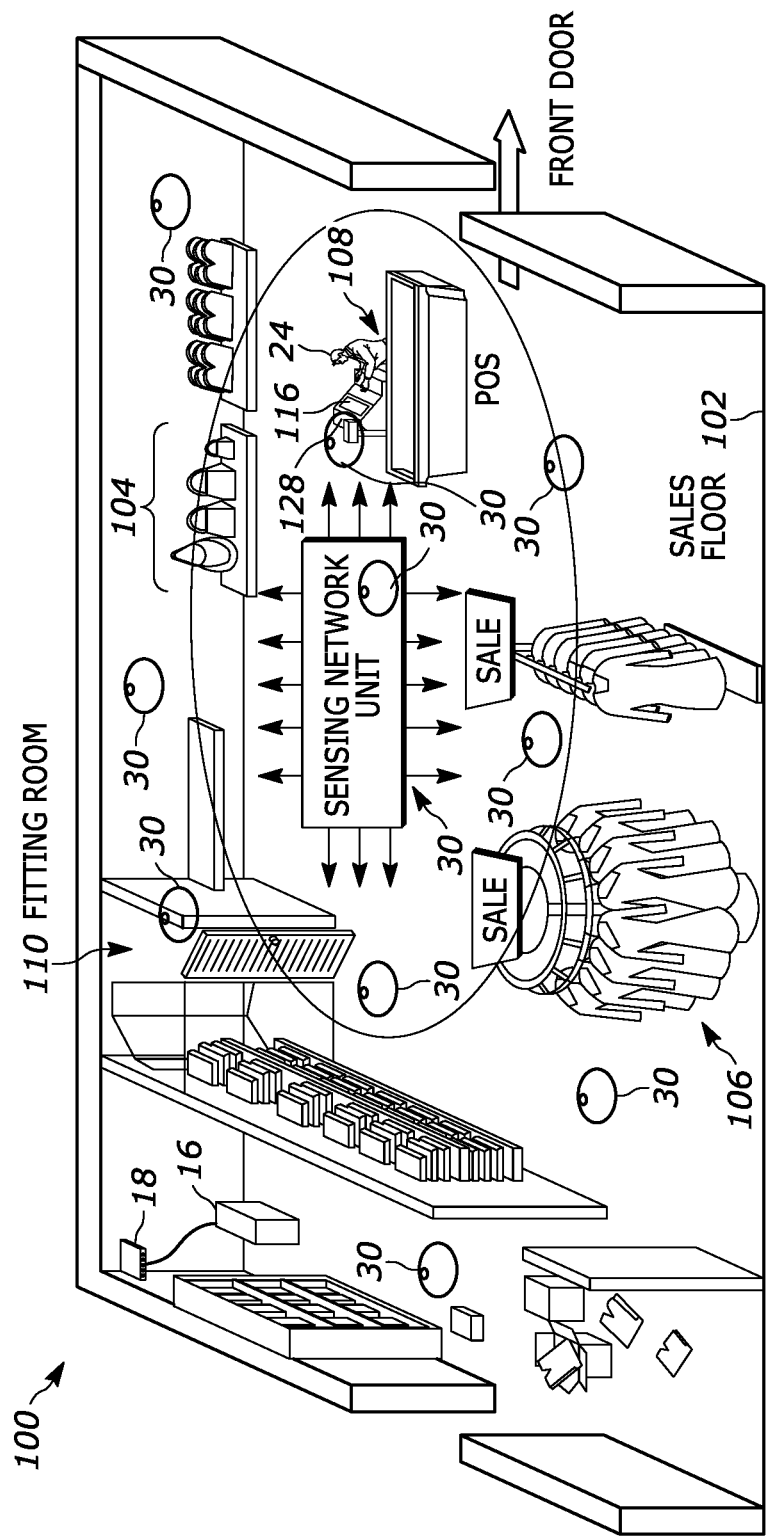
FIG. 2 illustrates an example venue in the form of a retail location having a retail sales floor on which a point-of-sale (POS) station is provided having a computer system and an interface.

FIG. 2 illustrates another example venue 100 in the form of a retail location having a retail sales floor 102 on which a point-of-sale (POS) station 108 is provided having a computer system 116 and an interface 128 having, for example, an optical scanner, touchpad, keypad, display, and data input/output interface connecting to the computer system 116. The computer system 116 is operated by an employee 24. The venue 100 further includes the network host computer or controller 16 connected to the plurality of target sensing stations 30 positioned throughout the venue 100, e.g., via the network switch 18. As further described herein, the target sensing stations 30 are able to locate and track targets including, for example, people, such as the employee 24, as well as the various retail products being offered for sale on the floor 102, e.g., clothes 106, handbags 104, etc., that are arranged on shelves, hangers, racks, etc. Each such product may be tagged with a radio frequency (RF) identification (RFID) tag for location and tracking as described.

The computer 116 may comprise one or more computers and is in wired, wireless, direct, or networked communication with the interface 128 and with each target sensing station 30, e.g., via the network switch 18. The interface 128 provides a human/machine interface, e.g., a graphical user interface (GUI), that presents information in pictorial and/or textual form (e.g., representations of locations of the RFID-tagged products 104, 106) to the employee 24, and to initiate and/or alter the execution of various processes that may be performed by the computer 116. The computer 116 and the interface 128 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the interface 128 may be in a smartphone, or tablet, etc., while the computer 116 may be a local computer, or a remotely hosted in a cloud computer. The computer 116 may include a wireless RF transceiver that communicates with each target sensing station 30. For example, Wi-Fi and Bluetooth are open wireless standards for exchanging data between electronic devices.

The methods and systems disclosed herein provide a means for more accurate position tracking of the items illustrated in the retail venue 100 illustrated in FIG. 2. The systems and methods described may enable higher spatial accuracy tracking of a clothing item 106 for inventory purposes or for theft prevention. For example, the target sensing stations 30 may allow for tracking of an item as the item is moved towards the POS station 108. The controller 16 may be in communication with POS station 108 to receive a communication of the purchasing of the clothing item 106. The target sensing station 30 may then send an alert to the controller 16 indicative of the clothing item 106 moving past a the POS station 108 towards the front door of the venue 100. The controller 16 may contain an event module or alert module which the generates an alert message and communicates the alert message to a theft alert system or to the interface 128, in the event that the clothing item 106 was not properly paid for or purchased as the clothing item 106 approaches the front door of the venue 100. The employee 24 may then take proper action to prevent theft of the clothing item 106, decreasing potential loss of profits due to theft.

Figure 3:
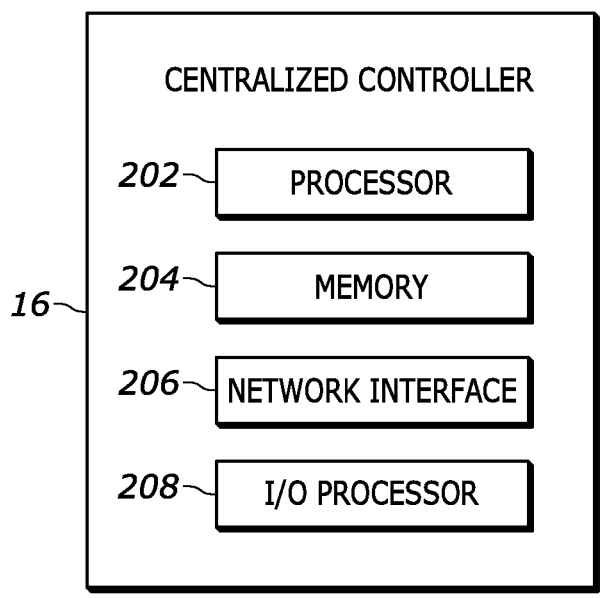
FIG. 3 is a block diagram representative of an example logic circuit capable of processing the bearing data from a plurality of the RFID sensing stations, and uses triangulation and/or trilateration to determine locations of RFID tags within a venue.

FIG. 3 is a block diagram representative of an example logic circuit capable of implementing, for example, one or more components of the example systems and specifically the controller 16 of FIG. 1. The controller 16 may be a host computer that processes the payloads and captures bearing data from a plurality of the RFID sensing stations, and uses triangulation and/or trilateration to determine locations of RFID tags within a venue.

The example controller 16 of FIG. 3 includes a processor 202, such as, for example, one or more microprocessors, controllers, and/or any suitable type of processor. The example controller 16 of FIG. 3 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204.

The example controller 16 of FIG. 3 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example controller 16 of FIG. 3 includes input/output (I/O) interfaces 208 to enable receipt of user input and communication of output data to the user, which may include, for example, any number of keyboards, mice, USB drives, optical drives, screens, touchscreens, etc. Further, in embodiments, the controller may include elements not illustrated in FIG. 3 such as an RFID tag database which may store information associated with a plurality of RFID tags such as current locations of the plurality of RFID tags, a history of locations of the RFID tags, associated items or products physically coupled to the RFID tags, etc.

Figure 4:
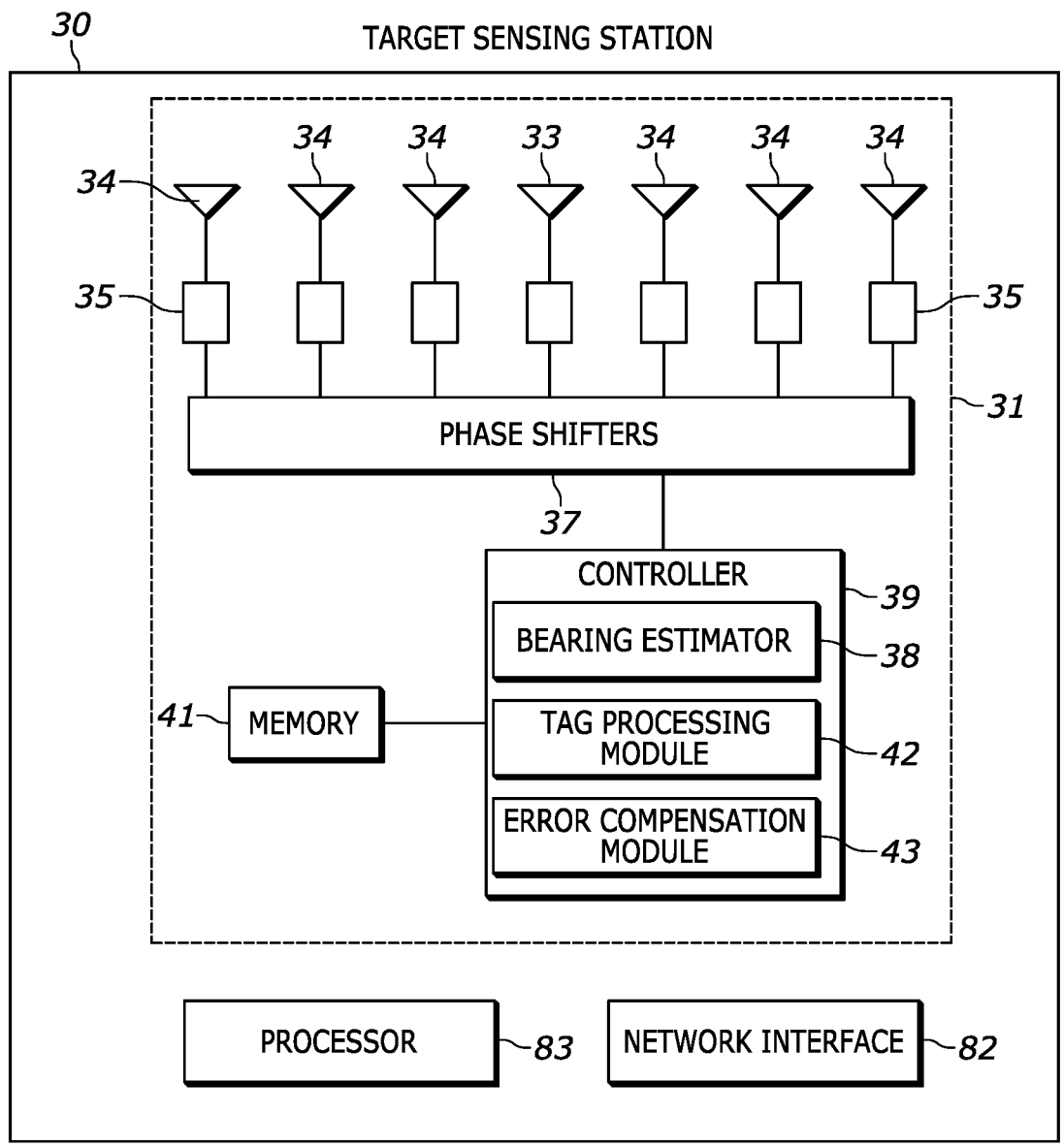
FIG. 4 illustrates an example of a target sensing system capable of implementing the example systems and methods for dynamic compensation of a phased array RFID reader.

FIG. 4 depicts an example implementation of the target sensing station 30. In the illustrated example, the station 30 includes, for example, a sensing unit in the form of a radio frequency (RF) identification (RFID) tag reader 31 operative for reading a RFID tag to determine a static location of the target and/or the position of the target as it moves within the venues 10 and 100 of FIGS. 1 and 2. More particularly, as shown in FIG. 4, each overhead RFID reader 31 includes phase shifters 37, a controller 39, a memory 41, and RF transceivers 35, which are operatively connected to a plurality of RFID antenna elements 34. The RFID antenna elements 34 are energized by the transceivers 35 to radiate an RF beam over an antenna beam pattern 22 (illustrated in FIG. 1 between target sensing station 30 and associated product 12, also termed a beamwidth herein. One of the RF transceivers 35 is further operatively coupled to a reference antenna element 33 to allow the controller 39 to selectively control the emission of a reference signal from the reference antenna element 33 for the methods for dynamic compensation of RFID antenna element phases as described herein. The controller 39 has a bearing estimator 38 for determining estimated RFID signal bearings of RFID signals transmitted by RFID tags and received by the antenna elements 34 of the RFID tag reader 31. The controller 39 also has a tag processing module 42 for identifying RFID tags from information contained in RFID signals received by the RFID reader 31, and an error compensation module 43 that performs some of the error compensation processes described by the methods disclosed herein, and discussed in further detail in reference to FIG. 6. While illustrated as a single block in FIG. 4, the phase shifters 37 may have multiple phase shifters configured to shift the phase of each of the signals received by the RFID antenna elements 34. Additionally, as a person of ordinary skill in the art would recognize, the RFID antenna elements 34 may emit and/or receive RFID signals according to the various embodiments of identifying RFID tags, determining bearings of received RFID signals, and performing phase-error compensation for RFID antenna arrays as described herein.

The RFID reader 31 is operated, under the control of the processor 83, to transmit RF beams to the tags on the targets, and to receive RF response signals from the tags, thereby interrogating and processing the payloads of the tags that are in a reading zone of the RFID target sensing station. The RFID reading zone is defined by the RFID antenna elements 34 and controlled through beam steering by the controller 39. In the illustration of FIG. 4, the target sensing station 30 has seven RFID antenna elements 33 and 34, each maintained in a fixed position. During operation, the RFID reader 31 captures payload data or target data that identifies the tags and their associated products 12. As shown in FIGS. 1 and 2, the centralized controller 16 controls the overhead RFID readers in the plurality of target sensing stations 30, to read the tags on the products 12 in a reading mode of operation in accordance with a set of reading parameters.

The processor 83 may communicate with a centralized controller through the network interface 82 to coordinate reading of RFID tags, and the processor may provide the central controller with bearing information of an RFID tag for the central controller to determine the location of an RFID tag in a venue. The processor 83 may communicate with a central controller to determine when to initiate compensation of a phased array RFID, as described by the methods disclosed herein.

The target sensing station 30 of FIG. 4 may further include a network interface 82 to enable communication with other machines, such as a centralized controller, via one or more computer networks, such as a local area network (LAN) or a wide area network (WAN), e.g., the Internet. The example network interface 82 may include any suitable type of communication interface(s) (e.g., wired and/or wireless interfaces) configured to operate in accordance with any suitable protocol(s), e.g., Ethernet for wired communications and/or IEEE802.11 for wireless communications.

The arrangement for locating and tracking a target in a venue may include a controller having one or more processors and one or more memories. That controller may be a centralized network controller or server, while in other examples that controller can be at one of many target sensing stations that collectively form the arrangement. The arrangement may include a plurality of target sensing stations deployed throughout a venue. Those target sensing stations may, for example, be deployed in overhead positions throughout the venue. Or the controller may be included in the target sensing station 30.

Figure 5:
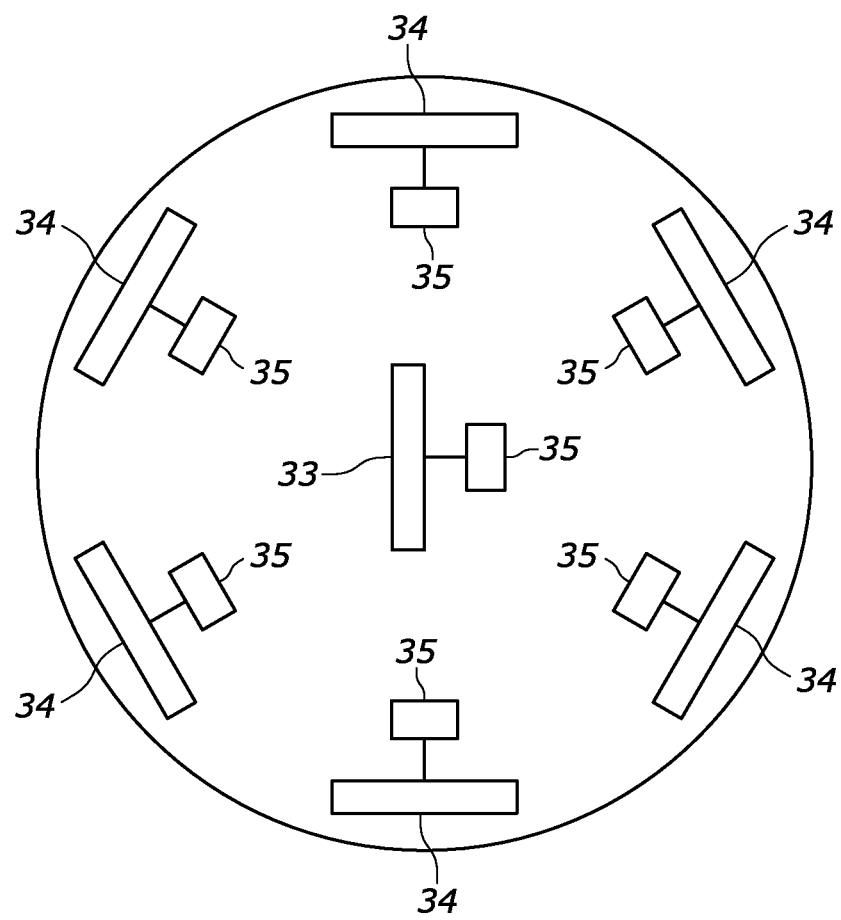
FIG. 5 is a plan view of an example target sensing station.
Figure 6:
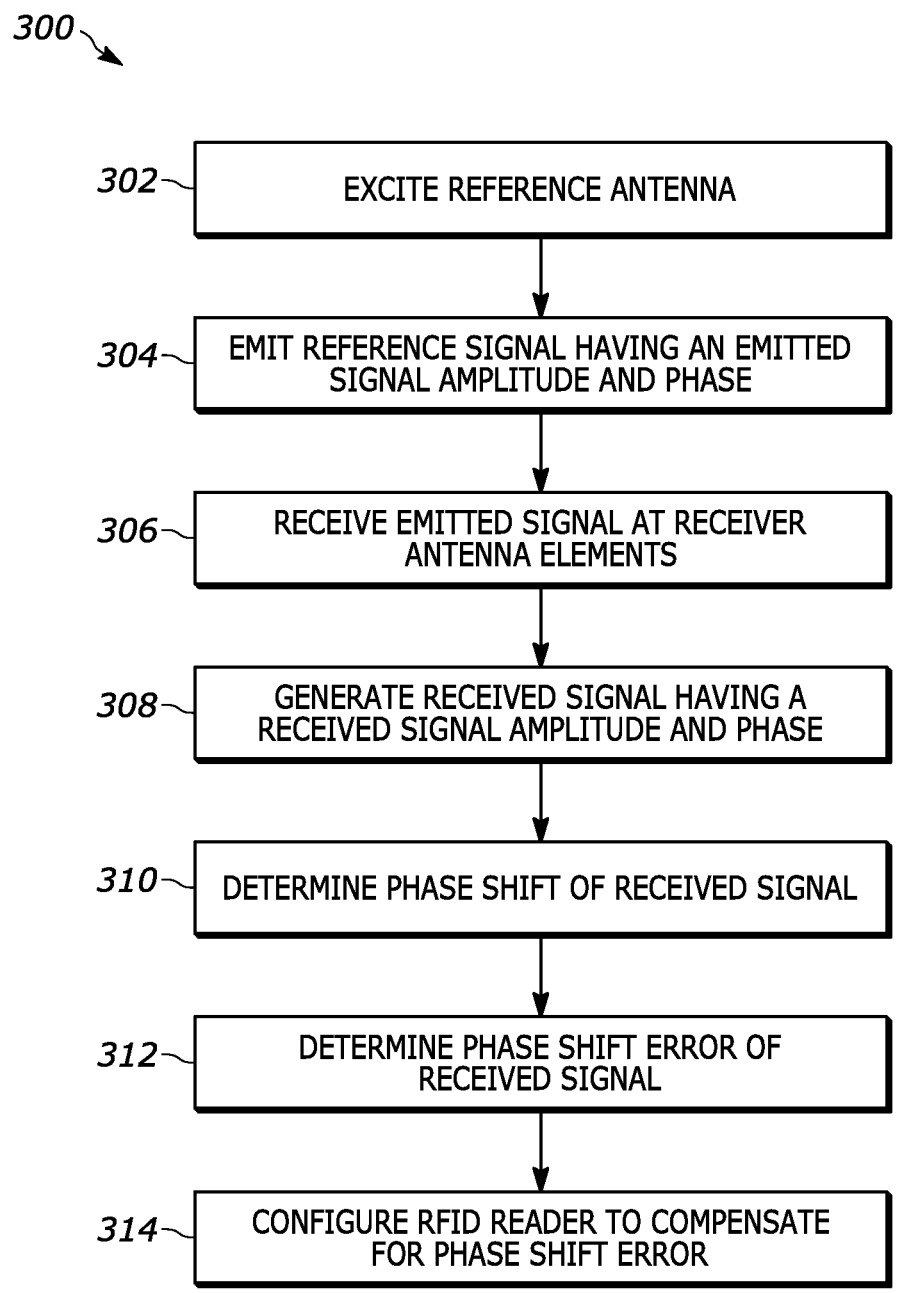
FIG. 6 is a flow diagram of a process for dynamic compensation of a phased array RFID reader.

FIG. 5 is a plan view of an example RFID reader 31. The RFID reader 31 of FIG. 5 includes RFID antenna elements 34 positioned around the perimeter of the RFID reader 31, and a reference antenna element 33 positioned at the center of the RFID reader 31. FIG. 6 is a flow diagram of an embodiment of a process 300 for dynamic compensation of a phased array RFID reader, such as the target sensing station illustrated in FIG. 4, and RFID reader illustrated in FIG. 5. Referring simultaneously to FIGS. 4, 5, and 6, in embodiments, at a process 302, the controller 39 in an RFID reader 31 may control the reference antenna element 33, or a transceiver 35 coupled to the reference antenna element 33, to excite the reference antenna element 33. At a process 304 the reference antenna element 33 may emit a reference emitted signal having an emitted signal frequency, phase, and amplitude. In embodiments, the reference emitted signal amplitude may be amplitude modulated for communicative purposes, or for calibration and phase compensation purposes as described herein.

In embodiments, the phase shifter 37 in electrical communication with the reference antenna element 33 may be set to shift the phase of the reference emitted signal by 0° so that any phase of the received signals at the RFID antenna elements 34 is a phase shift relative to the reference emitted signals 0° phase. It should be appreciated that the phase shifter 37 in electrical communication with the reference antenna element 33 may set the phase of the reference emitted signal to any arbitrary phase, and the phases and phase shifts of the received signals at the RFID antenna elements 34 may be determined in reference to the phase of the reference emitted signal.

At a process 306 each of the RFID antenna elements 34 may detect or receive the reference emitted signal. The RFID antenna elements 34 therefore act as receiver antenna elements as described herein. At a process 308, the transceivers 35, communicatively coupled to the RFID antenna elements 34, may generate received signals having respective received signal frequencies, phases, and amplitudes. In embodiments, the received signal frequency may be the same as the emitted signal frequency.

At a process 310, the error compensation module 43 determines a phase shift of the received signal relative to the phase of the emitted signal. For example, the error compensation module 43 may determine the phase shift by taking a difference of the received signal phase and the emitted signal phase. There is an expected amount of phase shift as a signal propagates from the reference antenna element 33 to each RFID antenna element 34, based on the distance from the reference antenna element 33 to each respective RFID antenna element 34. Additionally, the expected phase shifts are also dependent on the lengths of cables and electrical connections of the RFID antennas elements 34. The RFID reader 31 illustrated in FIG. 5 shows that each of the RFID antenna elements 34 are positioned at roughly the same distance from the reference antenna element 33, and therefore, the expected phases, and corresponding expected phase shifts, of the received signals generated by each of the RFID antenna elements 34 is approximately the same. In embodiments, receiver antenna elements may not be equidistant from the reference antenna element 33 and therefore the expected phase shifts of the received signals would not be equal for different receiver antenna elements. As an example, in embodiments, the controller may control one of the RFID antenna elements 34 and cause one of the RFID antenna elements 34 to emit a reference emitted signal. The other RFID antenna elements 34 may then receive the emitted signal, and generate respective received signals with phases dependent on each RFID antenna element's relative proximity from the RFID antenna element 34 that emitted the reference emitted signal.

At a process 312, the error compensation module 43 determines a phase-shift error of the received signal or signals. In embodiments, the phase-shift error is determined by comparing the determined phase shift of the received signal with the expected phase shift for the location of the respective RFID antenna element 34. For example, the phase-shift error may be determined by calculating a difference between the determined phase shift of the received signal and the expected phase shift for the location of the respective RFID antenna element 34. At a process 314, the controller 39 may control the phase shifters 37 to apply respective error-compensated phase shifts to signals received by the RFID antenna elements 34 to configure the RFID tag reader module 31 to compensate for the phase-shift error initiated with each of the RFID antenna elements 34. The compensated received RFID signals may then be provided to the bearing estimator 38 to determine more accurate angles of arrival of RFID signals, and provide better tracking of RFID tags and items in a venue.

In embodiments, the process 300 may be performed by a single reference antenna element 33 and a single receiver antenna element, such as one of the RFID antenna elements 34. It is envisioned that the process 300 may also be performed by one or more reference antenna elements 33 operating simultaneously, or sequentially, for a plurality of receiver antenna elements, such as the RFID antenna elements 34. In embodiments that perform the process 300 for a plurality of receiver antenna elements, each receiver antenna element may have a corresponding received signal phase, determined received signal phase shift, and determined received signal phase-shift error. Each of the determined phase-shift errors may be stored in the memory 41 and/or provided to the controller 39 and/or phase-shifters 37 to compensate for each of the phase-shift errors of the corresponding receiver antenna elements.

In embodiments, the process 300 may be repeated iteratively and a different one of the RFID antenna elements 34 may act as the reference antenna element 33 during each iteration. The process 300 may determine a phase-shift error compensation for each of the RFID antenna elements 34 for each iteration and the phase-shift error compensations for a given RFID antenna element may be combined, or averaged, to generate an average phase-shift error compensation for each of the RFID antenna elements 34. The average phase-shift error compensation may be more accurate than a phase-shift error compensation determined by a single iteration of the process 300 by taking into account small phase fluctuations due to electrical fluctuations, temperature changes, humidity levels, or changes to an RFID signal path or reference signal path.

In embodiments, the target sensing station 30 may perform further processes for compensating the phases of received signals to improve the location detection accuracy of the target or RFID in a venue. For example, in operation, the RFID antenna elements 34 of the sensing station 30 may receive an RFID tag signal from the target in a venue. The RFID antenna elements 34 may each generate a respective RFID tag received signal, and the phase shifters 37 may shift the respective phases of each of the RFID tag received signals according to determined phase-shift error compensations, resulting in compensated RFID tag signals. The bearing estimator 38 may analyze the compensated RFID tag signals, and more specifically, the phases of the compensated RFID tag signals to determine an angle of arrival of the RFID tag signal. The tag processing module 42 may determine an identification of the target in the venue based on information in the received RFID tag signal. Additionally, a centralized controller may obtain bearing estimates from one or more target sensing stations 30 to determine a target location in a venue.

In the embodiments of FIGS. 4 and 5, the reference antenna element 33 and the receiver antenna elements are described as being RFID antenna elements. In embodiments, each of the RFID antenna elements 34 and the reference antenna element 33 may be radio frequency antenna elements that are configured to emit and receive at least one of an extremely low frequency, a super low frequency, an ultra low frequency, a very low frequency, a low frequency, a medium frequency, a high frequency, a very high frequency, an ultra high frequency, a super high frequency, an extremely high frequency, or a tremendously high frequency. In embodiments, the reference antenna element 33 and the RFID antenna elements 34 may be an antenna element that is not a radio frequency antenna element.

The above descriptions refers to the accompanying drawings. Alternative implementations of the examples represented by the block diagrams and figures include one or more additional or alternative elements, processes and/or devices. Additionally or alternatively, one or more of the example block of the diagrams or elements of the figures may be combined, divided, re-arranged or omitted. Components represented by the blocks of the diagrams and elements of the figures are implemented by hardware, software, firmware, and/or any combination of hardware, software and/or firmware. In some examples, at least one of the components represented by the blocks of elements of the figures is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples, the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for configuring an RFID reader having an antenna array, the antenna array being housed within an RFID reader enclosure of the RFID reader, the method comprising:
   exciting, via a controller of the RFID reader, a reference antenna element of the antenna array;
   emitting, via the reference antenna element, an emitted signal, the emitted signal having an emitted signal amplitude, emitted signal frequency, and emitted signal phase;
   receiving the emitted signal via a receiver antenna element of the antenna array;
   generating, via the receiver antenna element, a received signal, the received signal having a received signal amplitude and a received signal phase;
   determining, via a processor, a phase shift of the received signal relative to the emitted signal;
   determining, via the processor, a phase-shift error, the phase-shift error being determined from a determined phase shift and an expected phase shift; and
   configuring the RFID reader to compensate for the phase-shift error associated with the receiver antenna element in response to receiving an RFID tag signal.

2. The method of claim 1, wherein the reference antenna element is a radio frequency antenna element.

3. The method of claim 1, wherein the receiver antenna element is a radio frequency antenna element.

4. The method of claim 1, wherein the emitted signal frequency is at least one of an extremely low frequency, a super low frequency, an ultra low frequency, a very low frequency, a low frequency, a medium frequency, a high frequency, a very high frequency, an ultra high frequency, a super high frequency, an extremely high frequency, or a tremendously high frequency.

5. The method of claim 1, wherein the phase shift is determined by the difference between the received signal phase and the emitted signal phase.

6. The method of claim 1, wherein the phase-shift error is determined by the difference between the determined phase shift and the expected phase shift.

7. The method of claim 1, wherein the emitted signal amplitude is a modulated emitted signal amplitude.

8. The method of claim 1, wherein the receiver antenna element is one of a plurality of receiver antenna elements; and further comprising:
   receiving the emitted signal at each of the plurality of receiver antenna elements;
   generating, via each of the plurality of receiver antenna elements, a plurality of received signals, each received signal of the plurality of received signals having a corresponding received signal amplitude and received signal phase;
   determining, via the processor, a plurality of phase shifts relative to the emitted signal, wherein each of the plurality of phase shifts corresponds to one of the received signals of the plurality of received signals;
   determining, via the processor, a plurality of phase-shift errors, each of the plurality of phase-shift errors corresponding to one of the plurality of receiver antenna elements, and each of the plurality of phase-shift errors being determined by a corresponding determined phase shift, of a plurality of determined of phase shifts, and an expected phase shift of a plurality of expected phase shifts; and
   configuring, in response to receiving an RFID tag signal, the RFID reader to compensate for each of the phase-shift errors of the plurality of phase-shift errors associated with each of the corresponding receiver antenna elements of the plurality of receiver antenna elements.

9. The method of claim 8, further comprising:
   receiving, via the plurality of receiver antenna elements of the antenna array, an RFID tag signal, the RFID tag signal having a corresponding RFID tag signal amplitude, and RFID tag signal phase at each of the plurality of receiver antenna elements;
   compensating, via the RFID reader, the phase shift of the RFID tag signal received at each of the plurality of receiver antenna elements;
   analyzing, via the processor, a compensated RFID tag signal to determine a plurality of compensated RFID tag signal phases received, the plurality of compensated RFID tag signal phases corresponding to the plurality of receiver antenna elements; and
   determining, via the processor, an angle of arrival of the RFID tag signal from the plurality of compensated RFID tag signal phases received at the plurality of receiver antenna elements.

10. The method of claim 8, further comprising:
   determining, a second reference antenna element from the plurality of receiver antenna elements;
   exciting, via the controller, the second reference antenna element;
   emitting, via the second reference antenna element, a second emitted signal, the second emitted signal having a second emitted signal amplitude, second emitted signal frequency, and second emitted signal phase;
   receiving the second emitted signal via a second plurality of receiver antenna elements, wherein the second plurality of receiver antenna elements comprises the first reference antenna element and the set of the plurality of receiver antenna elements excluding the second reference antenna element;
   generating, via the second plurality of receiver antenna elements, a plurality of secondary received signals, each secondary received signal of the plurality of secondary received signals having a corresponding received secondary signal amplitude and received secondary signal phase;
   determining, via the processor, a plurality of secondary phase shifts relative to the second emitted signal, wherein each of the plurality of secondary phase shifts corresponds to one of the second received signals of the plurality of secondary received signals;

determining, via the processor, a plurality of secondary phase-shift errors each corresponding to a receiver element of the second plurality of receiver antenna elements, and the plurality of secondary phase-shift errors being determined by a corresponding determined phase shift of a plurality of secondary determined phase shifts and a secondary expected phase shift of a plurality of secondary expected phase shifts; and configuring, in response to receiving an RFID tag signal, the RFID reader to compensate each of the second plurality of receiver antenna elements for each of the corresponding secondary phase-shift errors of the plurality of secondary phase-shift errors.

11. A system for configuring an RFID reader with an antenna array, the antenna array being housed within an RFID reader enclosure of the RFID reader, comprising:

a plurality of antenna elements, each of the plurality of antenna elements being part of the antenna array;

a phase shifter, configured to shift the phase of an electrical signal;

a non-transitory memory configured to store data and computer readable instructions;

a controller communicatively coupled to the plurality of antenna elements, wherein the controller is configured to excite the antenna elements, and receive excitations from the antenna elements; and a processor configured to execute the computer readable instructions to cause the system to:

excite, via the controller, a reference antenna element, the reference antenna element being one of the antenna elements of the plurality of antenna elements of the antenna array;

emit, via the reference antenna element, an emitted signal, the emitted signal having an emitted signal amplitude, emitted signal frequency, and emitted signal phase;

receive the emitted signal via a receiver antenna element, the receiver antenna element being one of the plurality of antenna elements of the antenna array;

generate, via the receiver antenna element, a received signal, the received signal having a received signal amplitude and a received signal phase;

determine, via the processor, a phase shift of the received signal relative to the emitted signal;

determine, via the processor, a phase-shift error, the phase-shift error being determined from a determined phase shift and an expected phase shift; and configure, in response to receiving an RFID tag signal, the RFID reader to compensate for the phase-shift error associated with the receiver antenna element.

12. The system of claim 11, wherein the reference antenna element is a radio frequency antenna element.

13. The system of claim 11, wherein the receiver antenna element is a radio frequency antenna element.

14. The system of claim 11, wherein the emitted signal frequency is at least one of an extremely low frequency, a super low frequency, an ultra low frequency, a very low frequency, a low frequency, a medium frequency, a high frequency, a very high frequency, an ultra high frequency, a super high frequency, an extremely high frequency, or a tremendously high frequency.

15. The system of claim 11, wherein the phase shift is determined by the difference between the received signal phase and the emitted signal phase.

16. The system of claim 11, wherein the phase-shift error is determined by the difference between the determined phase shift and the expected phase shift.

17. The system of claim 11, wherein the emitted signal amplitude is a modulated emitted signal amplitude.

18. The system of claim 11, wherein the receiver antenna element is one of a plurality of receiver antenna elements; and wherein the computer readable instructions further cause the system to:

receive the emitted signal at each of the plurality of receiver antenna elements;

generate, via each of the plurality of receiver antenna elements, a plurality of received signals, each received signal of the plurality of received signals having a corresponding received signal amplitude and received signal phase;

determine, via the processor, a plurality of phase shifts relative to the emitted signal, wherein each of the plurality of phase shifts corresponds to one of the received signals of the plurality of received signals;

determine, via the processor, a plurality of phase-shift errors, each of the plurality of phase-shift errors corresponding to one of the plurality of receiver antenna elements, and each of the plurality of phase-shift errors being determined by a corresponding determined phase shift, of a plurality of determined of phase shifts, and an expected phase shift of a plurality of expected phase shifts; and configure, in response to receiving an RFID tag signal, the RFID reader to compensate for each of the phase-shift errors of the plurality of phase-shift errors associated with each of the corresponding receiver antenna elements of the plurality of receiver antenna elements.

19. The system of claim 18, wherein the computer readable instructions further cause the system to:

receive, via the plurality of receiver antenna elements of the antenna array, an RFID tag signal, the RFID tag signal having a corresponding RFID tag signal amplitude, and RFID tag signal phase at each of the plurality of receiver antenna elements;

compensate, via the RFID reader, the phase shift of the RFID tag signal received at each of the plurality of receiver antenna elements;

analyze, via the processor, a compensated RFID tag signal to determine a plurality of compensated RFID tag signal phases received, the plurality of compensated RFID tag signal phases corresponding to the plurality of receiver antenna elements; and determine, via the processor, an angle of arrival of the RFID tag signal from the plurality of compensated RFID tag signal phases received at the plurality of receiver antenna elements.

20. The system of claim 18, wherein the computer readable instructions further cause the system to:

determine, a second reference antenna element from the plurality of receiver antenna elements;

excite, via the controller, the second reference antenna element;

emit, via the second reference antenna element, a second emitted signal, the second emitted signal having a second emitted signal amplitude, second emitted signal frequency, and second emitted signal phase;

receive the second emitted signal via a second plurality of receiver antenna elements, wherein the second plurality of receiver antenna elements comprises the first reference antenna element and the set of the plurality of receiver antenna elements excluding the second reference antenna element;

generate, via the second plurality of receiver antenna elements, a plurality of secondary received signals, each secondary received signal of the plurality of secondary received signals having a corresponding received secondary signal amplitude and received secondary signal phase;

determine, via the processor, a plurality of secondary phase shifts relative to the second emitted signal, wherein each of the plurality of secondary phase shifts corresponds to one of the second received signals of the plurality of secondary received signals;

determine, via the processor, a plurality of secondary phase-shift errors each corresponding to a receiver element of the second plurality of receiver antenna elements, and the plurality of secondary phase-shift errors being determined by a corresponding determined phase shift of a plurality of secondary determined phase shifts and a secondary expected phase shift of a plurality of secondary expected phase shifts; and configure, in response to receiving an RFID tag signal, the RFID reader to compensate each of the second plurality of receiver antenna elements for each of the corresponding secondary phase-shift errors of the plurality of secondary phase-shift errors.

\* \* \* \* \*